(12) United States Patent
Suzuki

(10) Patent No.: US 12,504,534 B2
(45) Date of Patent: Dec. 23, 2025

(54) DISTANCE DETECTION APPARATUS FOR VEHICLE

(71) Applicant: DENSO CORPORATION, Kariya (JP)

(72) Inventor: Yasuhiro Suzuki, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 379 days.

(21) Appl. No.: 18/156,288

(22) Filed: Jan. 18, 2023

(65) Prior Publication Data

US 2023/0152447 A1   May 18, 2023

Related U.S. Application Data

(63) Continuation of application No. PCT/JP2021/026131, filed on Jul. 12, 2021.

(30) Foreign Application Priority Data

Jul. 20, 2020  (JP) ................................. 2020123766

(51) Int. Cl.
  *G01S 13/931*  (2020.01)
  *G01S 7/40*  (2006.01)
  *G01S 7/41*  (2006.01)

(52) U.S. Cl.
  CPC .............. *G01S 13/931* (2013.01); *G01S 7/40* (2013.01); *G01S 7/41* (2013.01)

(58) Field of Classification Search
  CPC ............. G01S 13/931; G01S 7/40; G01S 7/41
  See application file for complete search history.

(56) References Cited

U.S. PATENT DOCUMENTS

| | | | | |
|---|---|---|---|---|
| 6,147,637 A | * | 11/2000 | Morikawa | G01S 7/4004 356/28 |
| 11,536,822 B2 | * | 12/2022 | Hiramoto | G01S 7/2955 |
| 2004/0104837 A1 | * | 6/2004 | Samukawa | G01S 17/931 342/70 |
| 2005/0128133 A1 | | 6/2005 | Samukawa et al. | |
| 2022/0057504 A1 | * | 2/2022 | Maekawa | G01S 13/32 |

* cited by examiner

*Primary Examiner* — Bernarr E Gregory
*Assistant Examiner* — Nazra Nur Waheed
(74) *Attorney, Agent, or Firm* — Maschoff Brennan

(57) ABSTRACT

In a distance detection apparatus for a vehicle, a distance detection unit is configured to detect object distances to an object around the vehicle by transmitting and receiving radar waves. A detection distance estimation unit is configured to estimate an estimated detection distance having a maximum value of the object distance, based on the object distances and intensities of the radar waves reflected by the object. A lost-track distance estimation unit is configured to estimate, as a lost-track distance, the object distance at a timing of transition from a detected state where the object is recognized to a non-detected state where the object is not recognized, based on a result of detection by the distance detection unit. A performance determination unit is configured to determine a degradation of detection performance of the distance detection unit based on the estimated detection distance and the lost-track distance.

12 Claims, 14 Drawing Sheets

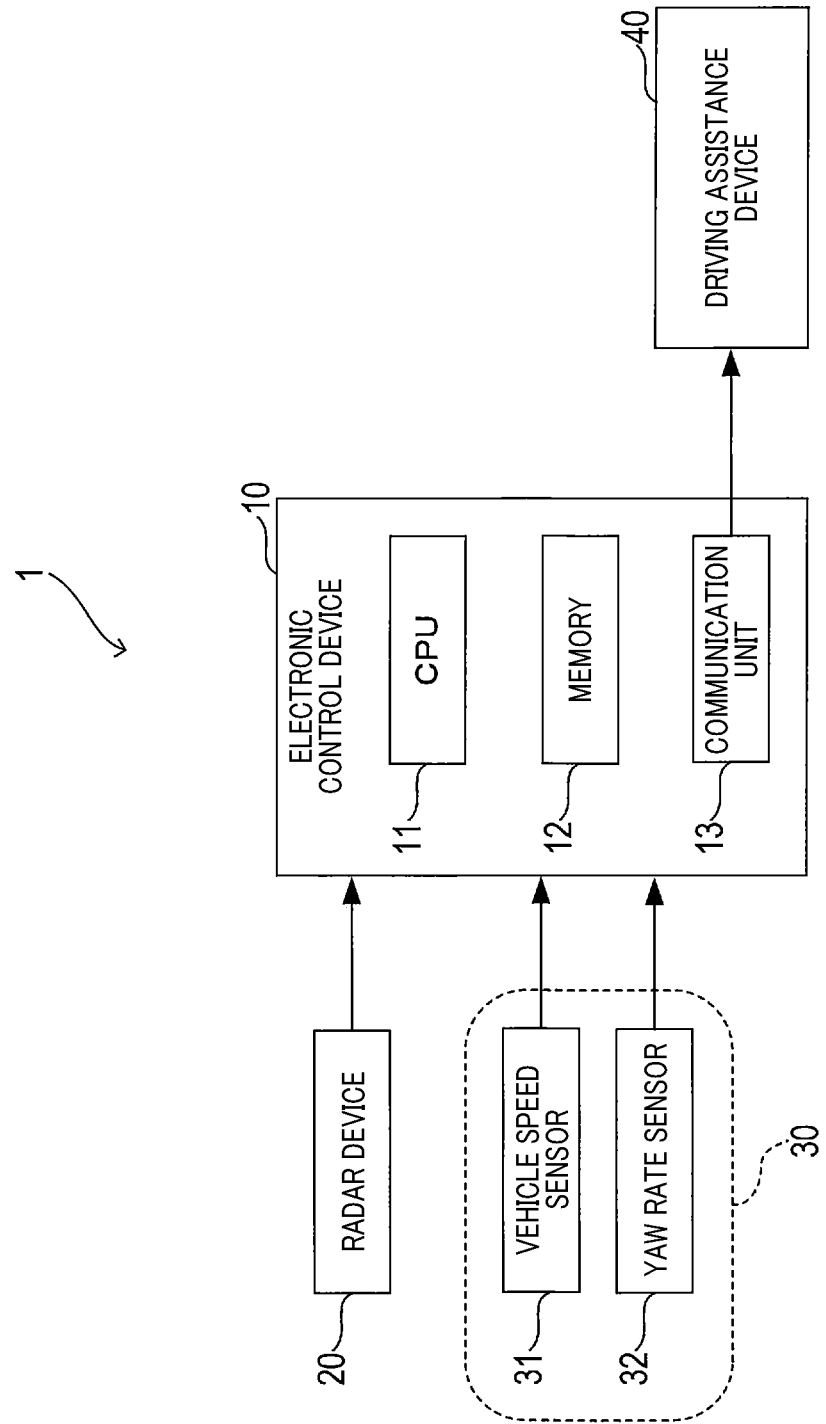

| | VARIABLE | VALUE | UNIT | PROCESS WHEN CONDITION IS MET |
|---|---|---|---|---|
| or | DIFFERENCE IN S/N BETWEEN LATEST AND OLDEST ESTIMATED DETECTION DISTANCES ON INTENSITY ESTIMATION LIST ≧ | 0.1 | TIMES | REPLACE DISTANCE LESS THAN "REFRESH DISTANCE", ON INTENSITY ESTIMATION LIST, WITH "REFRESH DISTANCE" |
| and | ELAPSED TIME SINCE LATEST TARGET SUBJECTED TO INTENSITY ESTIMATION WAS OBSERVED ≧ | 60 | SECONDS | |
| | NUMBER OF VALID VEHICLES ≧ | 0 | VEHICLES | |

TB4

| | VARIABLE | VALUE | UNIT | PROCESS WHEN CONDITION IS MET |
|---|---|---|---|---|
| and | ELAPSED TIME SINCE LATEST TARGET HAVING TRACK LOST WAS OBSERVED ≧ | 60 | SECONDS | REPLACE DISTANCE LESS THAN "REFRESH DISTANCE" ON LOST-TRACK ESTIMATION LIST, WITH "REFRESH DISTANCE" |
| or | NUMBER OF VEHICLES AT ESTIMATED DETECTION DISTANCES GREATER THAN OR EQUAL TO "BEST ESTIMATED DISTANCE" ON INTENSITY ESTIMATION LIST < | "BEST NUMBER OF VEHICLES" | | |
| | INTENSITY ESTIMATION AVERAGE ≧ | "BEST ESTIMATED DISTANCE" | m | |

TB5

| CURRENT DEGRADATION LEVEL | BEST ESTIMATED DISTANCE | REFRESH DISTANCE | BEST NUMBER OF VEHICLES |
|---|---|---|---|
| 0 | 200m | 200m | 3 VEHICLES |
| 1 | 200m | 190m | 3 VEHICLES |
| 2 | 200m | 165m | 3 VEHICLES |
| 3 | 150m | 140m | 3 VEHICLES |
| 4 | 130m | 115m | 3 VEHICLES |

FIG.14

| DEGRADATION LEVEL | LEVEL-UP DISTANCE THRESHOLD | LEVEL-DOWN DISTANCE THRESHOLD |
|---|---|---|
| 0 | — | — |
| 1 | 175m | 190m |
| 2 | 150m | 165m |
| 3 | 125m | 140m |
| 4 | 100m | 115m |

DISTANCE DETECTION APPARATUS FOR VEHICLE

CROSS-REFERENCE TO RELATED APPLICATION

This application is a continuation application of International Application No. PCT/JP2021/026131 filed Jul. 12, 2021 which designated the U.S. and claims priority to Japanese Patent Application No. 2020-123766 filed with the Japan Patent Office on Jul. 20, 2020, the contents of each of which are incorporated herein by reference.

BACKGROUND

Technical Field

The present disclosure relates to a distance detection apparatus for a vehicle.

Related Art

A technique is known for, in response to the status of an obstacle changing from pending status to recognized status, or in response to the status of an obstacle changing from recognized status to extrapolated status, determining a limit distance based on a result of detection of reflected waves whose signal level is lower than a preset signal level.

BRIEF DESCRIPTION OF THE DRAWINGS

In the accompanying drawings:

FIG. 1A is a block diagram of an obstacle recognition apparatus for a vehicle;

FIG. 13 is an illustration of refresh conditions; and

FIG. 14 is an illustration of degradation levels.

DESCRIPTION OF SPECIFIC EMBODIMENTS

Figure 1B:
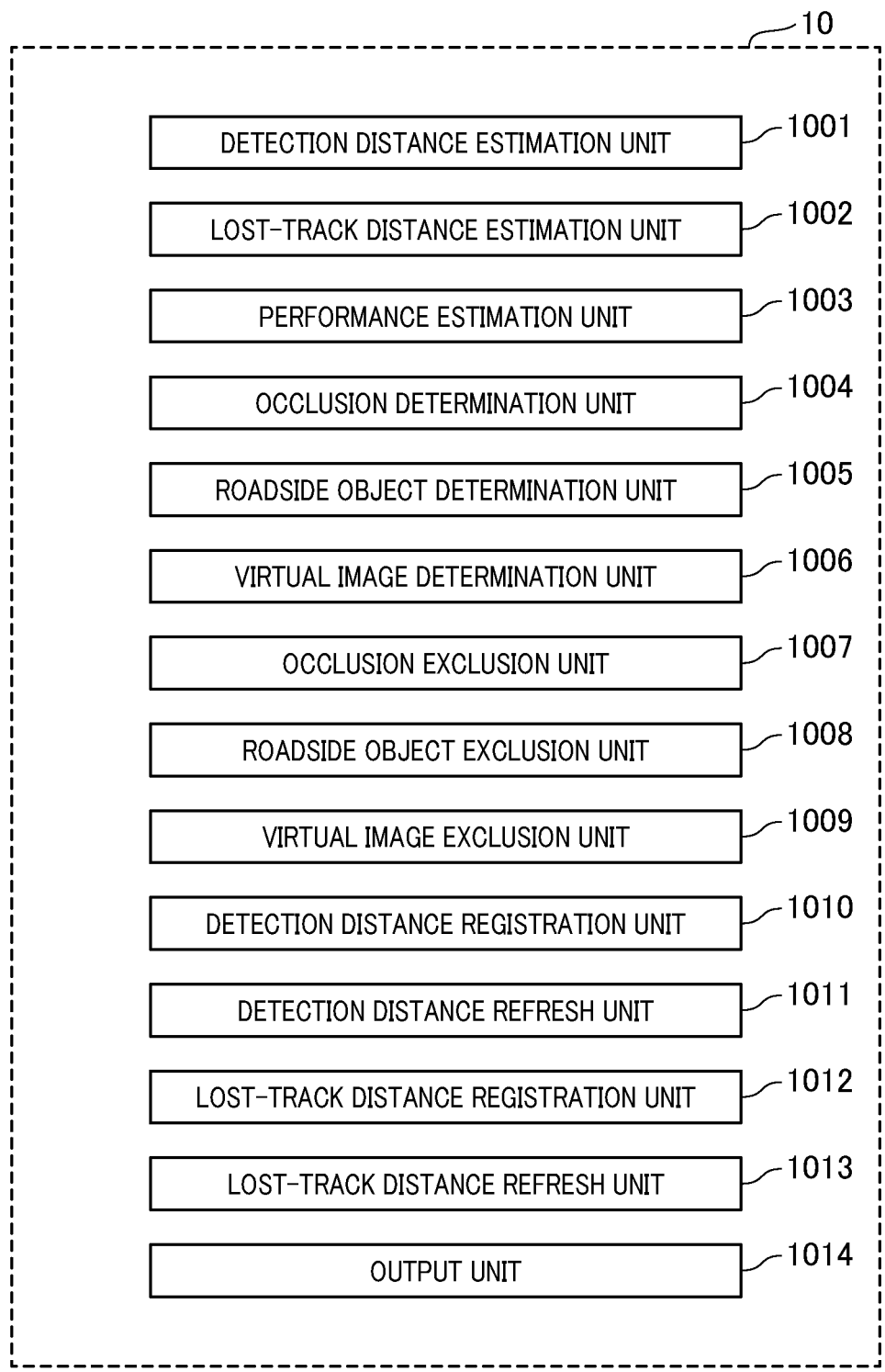
FIG. 1B is a functional block diagram of an electronic control device.

The higher performance of the adaptive cruise control function has led to higher performance of radar devices for detecting vehicles at greater distances. The above known technology, as disclosed in JP 3757936 B, uses sight end distances or maximum visible distances of vehicles to determine a degradation of performance of the radar devices. However, as a result of detailed research performed by the present inventors, the following issue has been found with the above conventional technology. As the performance of the radar devices is becoming higher, it is becoming more difficult to measure the sight end distances of vehicles in actual environments, leading to difficulty in self-determining the degradation of performance. Example actual environments include scenes where a track is lost due to obstruction by surrounding vehicles or road structures, and scenes where a preceding vehicle can not be observed until the track of the preceding vehicle is lost while following it.

In view of the foregoing, it is desired to have a technique for increasing the accuracy of determining a degradation of distance detection performance.

One aspect of the present disclosure provides a distance detection apparatus for a vehicle, including a distance detection unit, a detection distance estimation unit, a lost-track distance estimation unit, and a performance determination unit.

The distance detection unit is configured to detect object distances to an object around the vehicle by transmitting and receiving radar waves.

The detection distance estimation unit is configured to estimate an estimated detection distance having a maximum value of the object distance detectable by the distance detection apparatus, based on the object distances detected by the distance detection unit and intensities of the radar waves reflected by the object and received by the distance detection unit.

The lost-track distance estimation unit is configured to estimate, as a lost-track distance, the object distance at a timing of transition from a detected state in which the distance detection unit is aware of presence of the object to a non-detected state in which the distance detection unit is not aware of presence of the object, based on a result of detection by the distance detection unit.

The performance determination unit is configured to determine a degradation of detection performance of the distance detection unit based on the estimated detection distance and the lost-track distance.

The distance detection apparatus configured as above can estimate the object distance at which the radar wave intensity is at or below a preset value that is lower than the reception intensity, as the estimated detection distance, based on the object distances and the radar wave reception intensities. This allows the distance detection apparatus to estimate the estimated detection distance even in a case where the distance detection apparatus is unable to detect the object distance at the timing of transition from the detected state to the non-detected state (i.e., the lost-track distance), near the limit distance at which the distance detection apparatus can barely detect the object distance.

Therefore, the distance detection apparatus of the present disclosure is capable of increasing the accuracy of determining a degradation of distance detection performance.

The distance detection apparatus estimates the object distance at the timing of transition from the detected state to the non-detected state as a lost-track distance. This allows the distance detection apparatus to determine the degradation of detection performance of the distance detection unit, arising from water adhering to the vehicle in a rainfall environment or from a condition of an optical window surface of the distance detection apparatus, which does not follow the radar equation.

Therefore, the obstacle recognition apparatus of the present disclosure is capable of further increasing the accuracy of determining a degradation of distance detection performance.

Hereinafter, some embodiments of the disclosure will be described with reference to the drawings.

An obstacle recognition apparatus 1 for a vehicle according to the present embodiment includes an electronic control device 10, a radar device 20, and a sensor unit 30, as illustrated in FIG. 1A. Hereinafter, a vehicle carrying the obstacle recognition apparatus 1 is referred to as an own vehicle.

The electronic control device 10 is configured around a microcomputer that includes a CPU 11, a ROM, a RAM and the like. The various functions of the microcomputer are implemented by the CPU 11 executing a program stored in a non-transitory tangible storage medium. In this example, the ROM corresponds to a non-transitory tangible storage medium storing the program. Execution of this program allows a method corresponding to the program to be performed. Some or all of the functions implemented by the CPU 11 may be configured in hardware using one or more integrated circuits (ICs) or the like. The electronic control device 10 may be constituted by single or plural microcomputers configured as above.

The electronic control device 10 includes the CPU 11, a semiconductor memory 12 (hereinafter referred to as "memory 12"), such as the RAM, the ROM and a flash memory, and a communication unit 13.

The communication unit 13 is data-communicatively connected to other onboard devices via communication lines, and transmits and receives data according to, for example, the CAN communication protocol. CAN is an abbreviation for Controller Area Network. CAN is a registered trademark.

Figure 2:
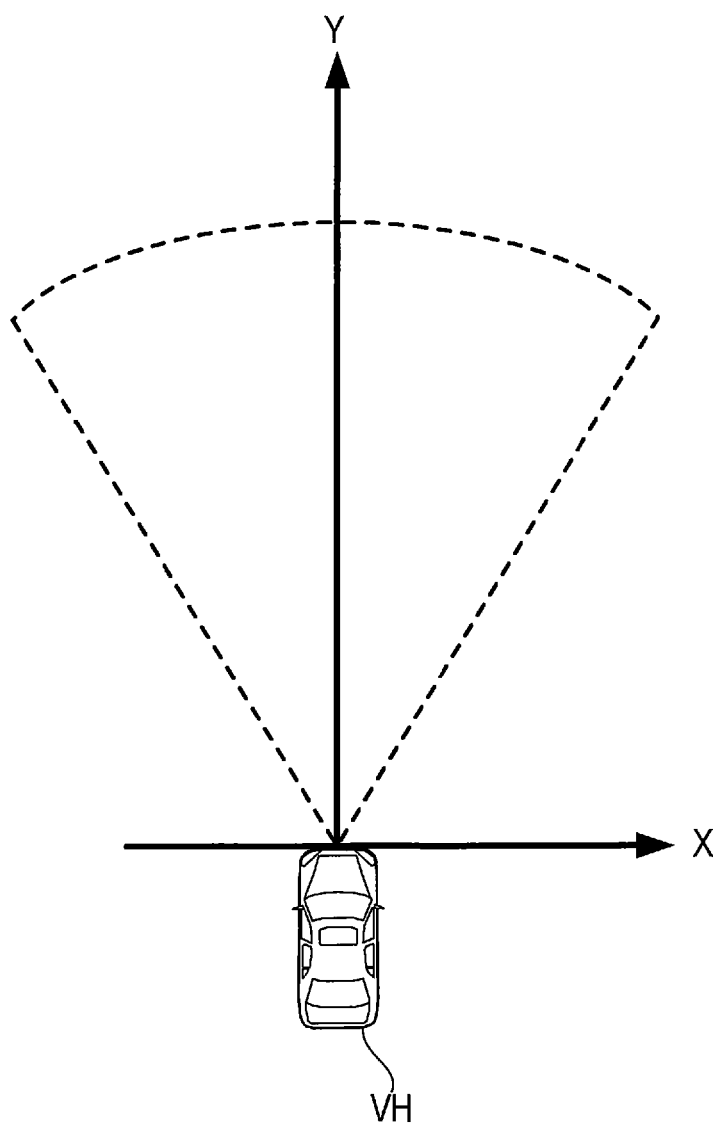
FIG. 2 is an illustration of a coverage of radar waves.

The radar device 20 is mounted to the front side of the own vehicle VH, as illustrated in FIG. 2. Each time a preset measurement period elapses, the radar device 20 emits and scans radar waves forward of the own vehicle VH within a predefined angular range in each of the horizontal and vertical directions, and detects reflected radar waves, thereby measuring distances and angles to respective points on an object reflecting the radar waves (hereinafter referred to as range points). The horizontal direction is the lateral (or widthwise) direction of the own vehicle, and the vertical direction is perpendicular to the lateral direction of the own vehicle. The radar device 20, for example, scans radar waves horizontally and receives the reflected waves with a light receiving element that is divided vertically, thereby performing scanning with two-dimensional resolution.

The radar device 20 measures the distance and the angle of each range point every frame with one frame for each measurement period.

The radar device 20 may be, for example, a millimeter-wave radar that uses electromagnetic waves in the millimeter-wave band as radar waves, a laser radar that uses laser beams as radar waves, or a sonar that uses sound waves as radar waves.

Figure 3:
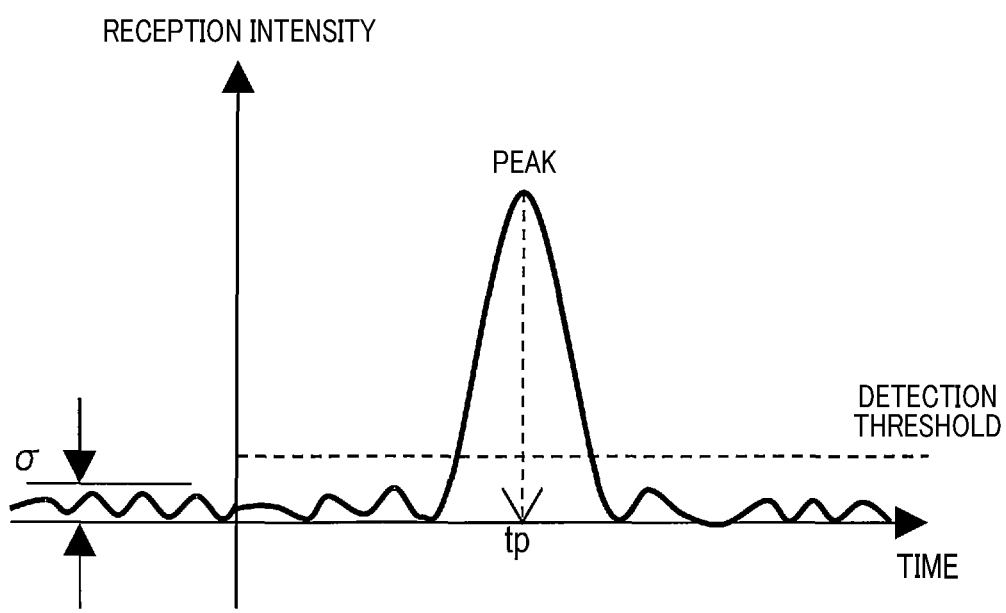
FIG. 3 is an illustration of a pulse waveform.

The radar device 20 receives reflected radar waves in a pulse waveform as illustrated in FIG. 3. The radar device 20 detects a pulse waveform whose reception intensity exceeds a detection threshold as a range point, where the reception intensity at the peak of this pulse waveform is the reflection intensity.

The radar device 20 calculates a distance to each range point based on the time tp at the peak of the pulse waveform. The radar device 20 calculates an angle at which the range point is located based on the scanning direction of the radar wave.

The radar device 20 outputs to the electronic control device 10 range point information indicating the distance, the angle and the reflection intensity of each range point.

As illustrated in FIG. 1A, the electronic control device 10 transmits results of measurement by the radar device 20, for example, to a driving assistance device 40 that provides driving assistance, via the communication unit 13.

The sensor unit 30 includes at least one sensor that detects behaviours of the own vehicle. In the present embodiment, as an example, the sensor unit 30 includes a vehicle speed sensor 31 that outputs a vehicle speed detection signal corresponding to the vehicle speed to the electronic control device 10 and a yaw rate sensor 32 that outputs a yaw rate detection signal corresponding to the yaw rate to the electronic control device 10.

A procedure of a main routine performed by the electronic control device 10 will now be described. The main routine is a process performed repeatedly every measurement period during operation of the electronic control device 10.

Figure 4:
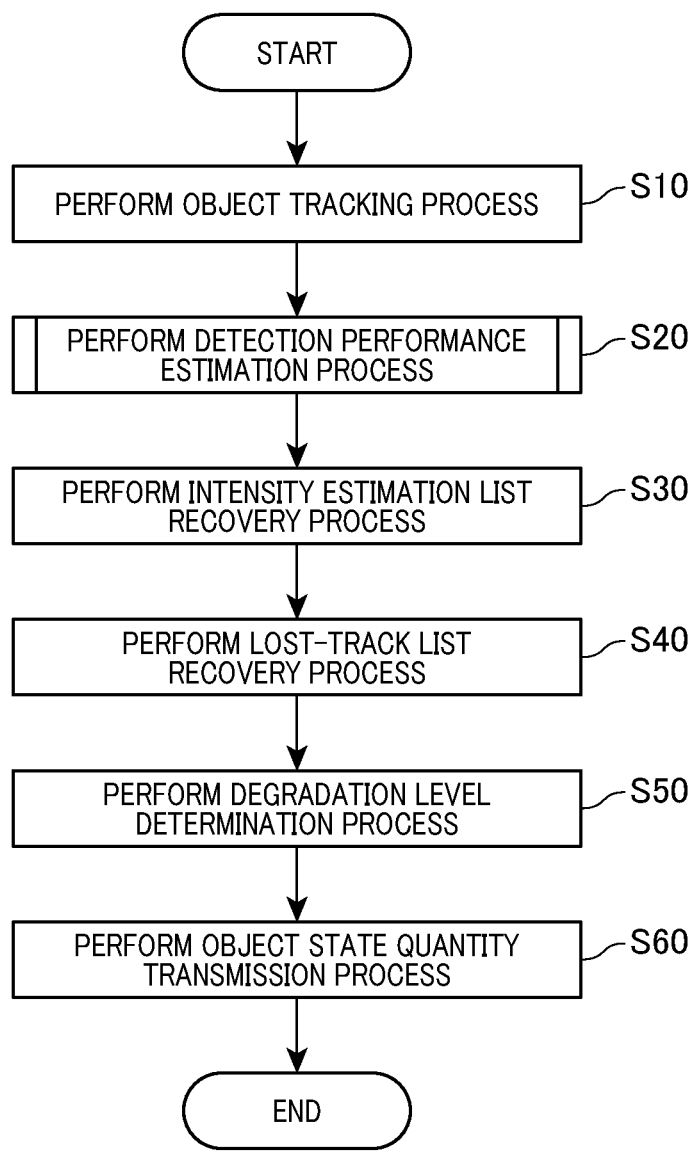
FIG. 4 is a flowchart of a main routine.

Upon initiation of the main routine, the electronic control device 10 first performs object tracking at S10, as illustrated in FIG. 4.

Specifically, the electronic control device 10 calculates, for each of a plurality of range points detected by the radar device 20 in the most recent frame (i.e., the current frame), lateral and longitudinal positions of the range point based on its distance and angle. The lateral position is a position along the lateral direction of the own vehicle relative to the own vehicle. The longitudinal position is a position along the direction perpendicular to the lateral direction of the own vehicle relative to the own vehicle.

The electronic control device 10 performs, for each of the plurality of range points in the current frame (hereinafter referred to as current range points), a history tracking process to determine whether it represents the same target as a certain one of the range points in the previous frame (hereinafter referred to as previous range points).

Specifically, the electronic control device 10 calculates a predicted position of each of the previous range points in the current frame based on information about the previous range points. The electronic control device 10 calculates, for each of the current range points, a difference between the position of the current range point and the predicted position of each of the previous range points. In response to there being a certain one of the previous range points with a difference between its predicted position and the position of the current range point less than a preset upper limit, the electronic control device 10 determines that there is a historical connection for the current range point. The electronic control device 10 recognizes each range point for which the historical connection continues for a plurality of frames (e.g., 5 frames) as a target. The electronic control device 10 calculates a relative speed of each current range point determined to be a target, based on a difference between the position of the current range point and the position of the corresponding previous range point and the measurement period (i.e., a duration of one frame).

Subsequently, the electronic control device 10 selects, from the range points each recognized to be a target, range points that meet a preset same-object selection condition for selecting range points arising from the same object (hereinafter referred to as same-object range points). In the present embodiment, for example, assuming that the range point on a target, closest to the own vehicle, is a representative range point, the same-object selection condition may be a condition that a difference in distance to the representative range point is less than or equal to a preset distance selection criterion value, and a difference in angle to the representative range point is less than or equal to a preset angle selection criterion value, and a difference in relative speed to the representative range point is less than or equal to a preset relative-speed selection criterion value.

The electronic control device 10 extracts, from the selected same-object range points, the range point located rightmost (hereinafter referred to as the rightmost range point) and the range point located leftmost (hereinafter referred to as the leftmost range point) based on calculated lateral positions of the selected same-object range points. The electronic control device 10 determines the center value of the lateral positions of the rightmost range point and the leftmost range point as a lateral center position x of the object. The electronic control device 10 determines a difference between the lateral positions of the rightmost range point and the leftmost range point as a width of the object.

Based on calculated longitudinal positions of the selected same-object range points, the electronic control device 10 extracts the range point located frontmost (hereinafter referred to as the frontmost range point) and the range point located rearmost (hereinafter referred to as the rearmost range point). The electronic control device 10 determines the center value of the longitudinal positions of the frontmost range point and the rearmost range point as a longitudinal center position y of the object. The electronic control device 10 determines a difference between longitudinal positions of the frontmost range point and the rearmost range point as a depth of the object.

Therefore, the electronic control device 10 recognizes a rectangle surrounding the rightmost, leftmost, frontmost, and rearmost range points as an object.

In response to determining that there is a history connection between an object in the previous frame and an object in the current frame based on the determination result from the history tracking process, the electronic control device 10 uses the lateral center position x and the longitudinal center position y of the object in the previous frame, the lateral center position x and the longitudinal center position y of the object in the current frame, and the measurement period (i.e., the duration of one frame) to calculate a lateral relative speed vx and a longitudinal relative speed vy of the object in the current frame.

In response to the electronic control device 10 failing to historically connect an object recognized in the previous frame to an object recognized in the current frame, the electronic control device 10 extrapolate the lateral center position x, the longitudinal center position y, the lateral relative speed vx, and the longitudinal relative speed vy of the object recognized in the current frame from the lateral center position x, the longitudinal center position y, the lateral relative speed vx, and the longitudinal relative speed vy of the object recognized in the previous frame.

The electronic control device 10 sets the number of tracked frames and the number of extrapolated frames for each of the objects recognized in the current frame. The number of tracked frames is the number of consecutive successful historical connections. The number of extrapolated frames is the number of consecutive extrapolations.

Upon completion of S10, the electronic control device 10 performs a detection performance estimation process at S20.

The procedure of the detection performance estimation process will now be described.

Figure 5:
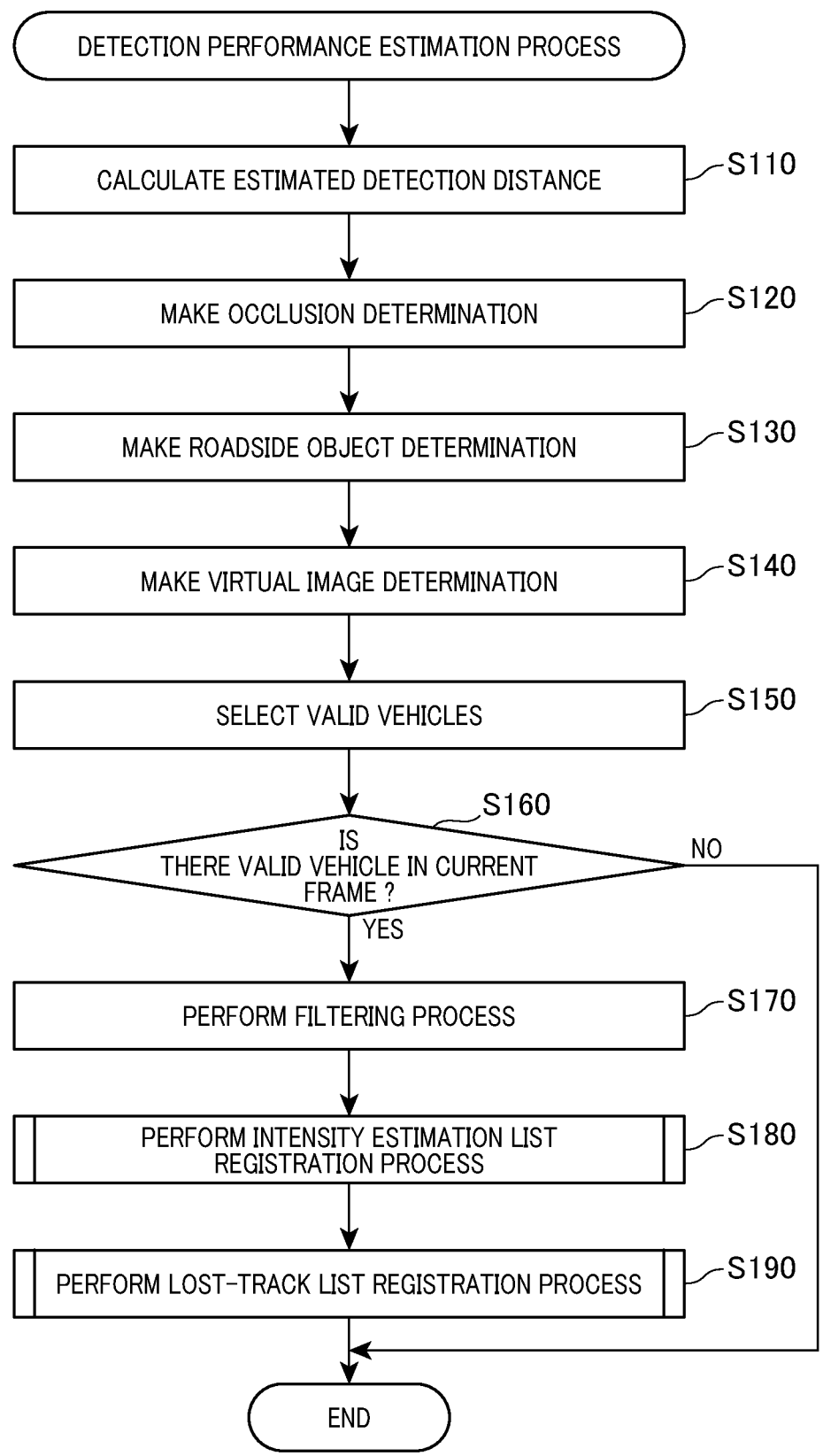
FIG. 5 is a flowchart of a detection performance estimation process.

Upon the detection performance estimation process being performed, the electronic control device 10 first calculates an estimated detection distance at S110, as illustrated in FIG. 5. Specifically, for each of one or more objects recognized in object tracking at S10, the electronic control device 10 selects a range point with the highest reflection intensity from one or more range points constituting the object. The electronic control device 10 calculates an estimated detection distance $D_x$ for each of the one or more objects according to Equation (1), where $D_0$ is a distance to the selected range point, $P_0$ is the reflection intensity of the selected range point, $T_0$ is a detection threshold, and $\alpha$ is a margin factor. The margin factor $\alpha$ is provided for calculating the estimate with a margin before intersecting the detection threshold.

$$D_x = \sqrt[4]{P_0/(T_0 + \alpha)} \times D_0 \quad (1)$$

The electronic control device 10 calculates the detection threshold $T_0$ every measurement period according to Equation (2). $\sigma$ in Equation (2) is the standard deviation of reception intensities of radar waves during a non-emission period from the end of the radar wave emission to the start of the next radar wave emission, as illustrated in FIG. 3. N is an integer greater than or equal to 2.

$$T_0 = N \times \sigma \quad (2)$$

Figure 6:
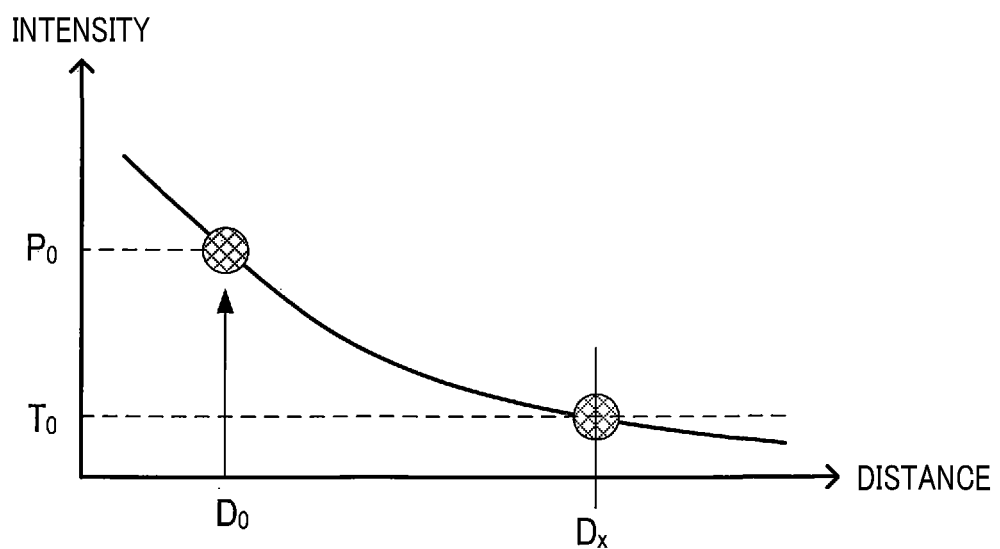
FIG. 6 is an illustration of how to calculate an estimated detection distance.

As illustrated in FIG. 6, the estimated detection distance $D_x$ is a distance at which the reflection intensity drops to $T_0$ with the reflection intensity $P_0$ at the distance $D_0$.

Figure 7:
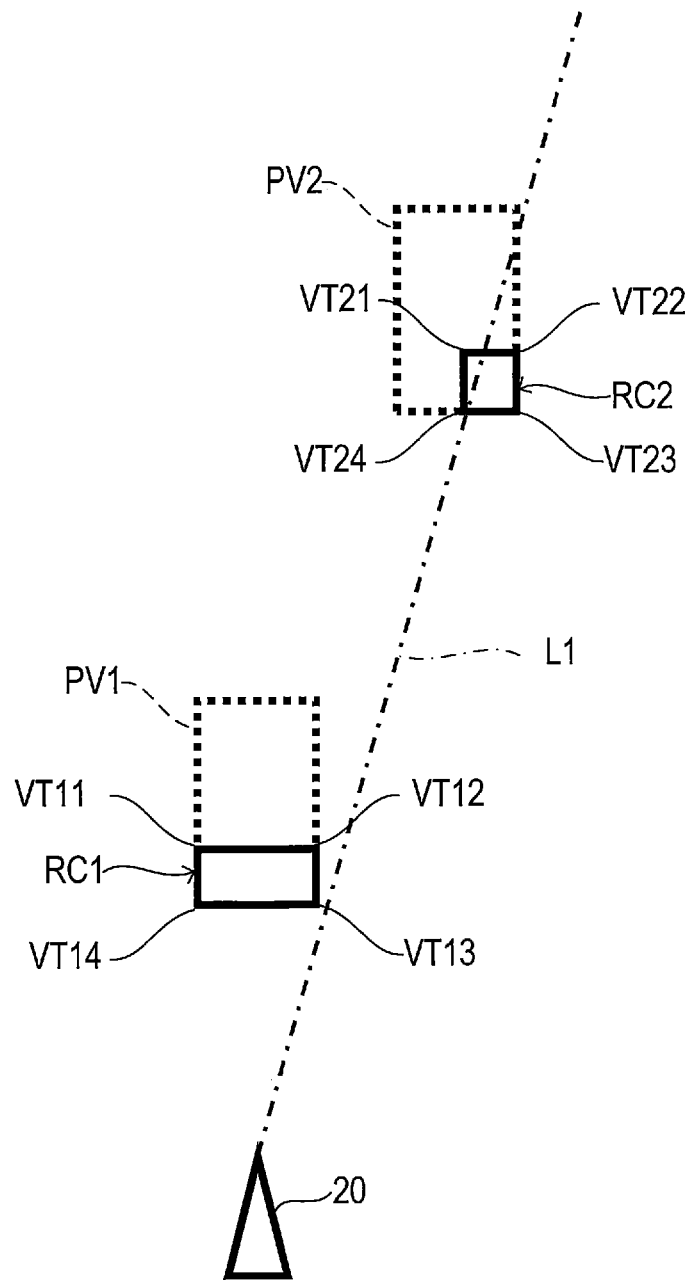
FIG. 7 is an illustration of how to make an occlusion determination.

Upon completion of the process step S110, the electronic control device 10 makes an occlusion determination at S120, as illustrated in FIG. 5. The occlusion refers to a situation where, as illustrated in FIG. 7, a first preceding vehicle PV1 is located forward of the radar device 20 of the own vehicle, a second preceding vehicle PV2 is located forward of the first preceding vehicle PV1, and the second preceding vehicle PV2 is partially hidden behind the first preceding vehicle PV1 as seen from the radar device 20. The electronic control device 10 extracts hidden objects from the objects recognized at S10 by making the occlusion determination.

An example of the occlusion determination method will now be described with reference with FIG. 7.

It is assumed that the electronic control device 10 recognizes a rectangular object RC1 due to the presence of the first preceding vehicle PV1 and a rectangular object RC2 due to the presence of the second preceding vehicle PV2. The rectangle of object RC1 has four vertices VT11, VT12, VT13, and VT14. The rectangle of object RC2 has four vertices VT21, VT22, VT23, and VT24.

In such a situation that a straight line L1 passing through the rear right vertex VT13 of the rectangle of object RC1 and the radar device 20 passes through the rear left vertex VT24 of the rectangle of object RC2, it may be determined that the second preceding vehicle PV2 is partially hidden behind the first preceding vehicle PV1.

Upon completion of the process step S120, the electronic control device 10 makes a roadside object determination at S130, as illustrated in FIG. 5. Specifically, the electronic control device 10 calculates the vehicle speed of the own vehicle based on the vehicle speed detection signal from the vehicle speed sensor 31. The electronic control device 10 extracts, from the objects recognized at S10, objects whose difference between the relative speed and the vehicle speed of the own vehicle is less than a preset roadside object threshold (e.g., 10 km/h or less) as roadside objects.

Figure 8:
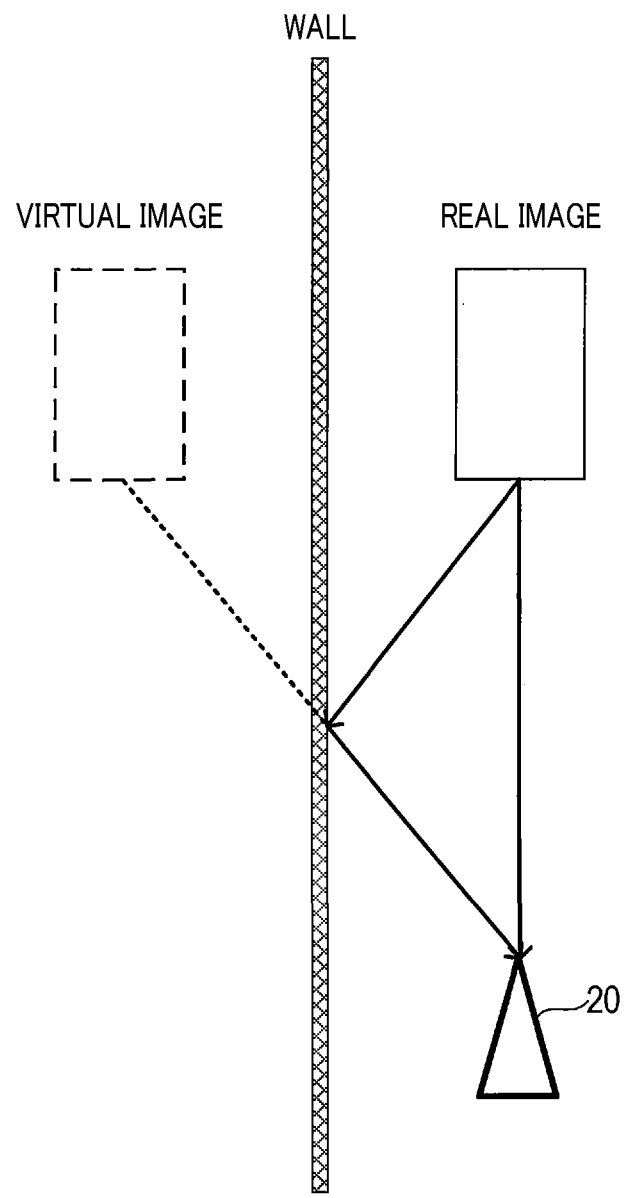
FIG. 8 is an illustration of real and virtual images.

Upon completion of the process step S130, the electronic control device 10 makes a virtual image determination at S140, as illustrated in FIG. 5. As illustrated in FIG. 8, a virtual image is an image that is recognized as an object, for example, in a situation where radar waves transmitted from the radar device 20 are reflected by an object after being reflected by a stationary object (a tunnel wall or soundproof wall in FIG. 8), and then the radar waves reflected by the stationary object are received by the radar device 20. The virtual image may lead to an erroneous determination that the performance of the radar device 20 has deteriorated because of its low reflection intensity.

Specifically, the electronic control device 10 identifies a pair of virtual image and real image from the tracked objects based on a preset pair determination condition, and extracts the object with the lower reflection intensity from the identified pair as a virtual image. The virtual image is characterized by a difference in distance from the real image being less than or equal to a preset threshold (e.g., 5 m or less) and a difference in relative speed from the real image being less than or equal to a preset threshold (e.g., 5 km/h or less). The pair determination condition is set based on these characteristics.

Upon completion of the process step S140, the electronic control device 10 selects valid vehicles at S150, as illustrated in FIG. 5. Specifically, the electronic control device 10 excludes the objects extracted at the process steps S120 to S140 from the objects recognized at S10, and selects the remaining objects as valid vehicles.

At S160, the electronic control device 10 determines whether there is a valid vehicle in the current frame, based on the result of selection at S150. If there is no valid vehicle in the current frame, the electronic control device 10 terminates the detection performance estimation process.

If there is a valid vehicle in the current frame, the electronic control device 10 performs a filtering process at S170.

Specifically, the electronic control device 10 calculates, for each of the valid vehicles selected at S150, a sum of the estimated detection distances calculated at S110, the number of calculations of the estimated detection distance, and the average of the estimated detection distances. The sum of the estimated detection distances is hereinafter referred to as the total sum of estimates. The number of calculations of the estimated detection distance is referred to as the total number of samples. The average of the estimated detection distances is referred to as the average of estimates.

The total sum of estimates is calculated by adding the estimated detection distance calculated in the current frame to the total sum of estimates calculated in the previous frame. The total number of samples is calculated by adding one to the total number of samples calculated in the previous frame. The average of estimates is calculated by dividing the total sum of estimates by the total number of samples. The total sum of estimates and the total number of samples are initialized (i.e., set to 0) when the estimated detection distance for the corresponding object is registered in at least one of a first intensity estimation list LS1 and a second intensity estimation list LS2, described later.

Subsequently, the electronic control device 10 performs an intensity estimation list registration process at S180.

The procedure of the intensity estimation list registration process will now be described.

Figure 9:
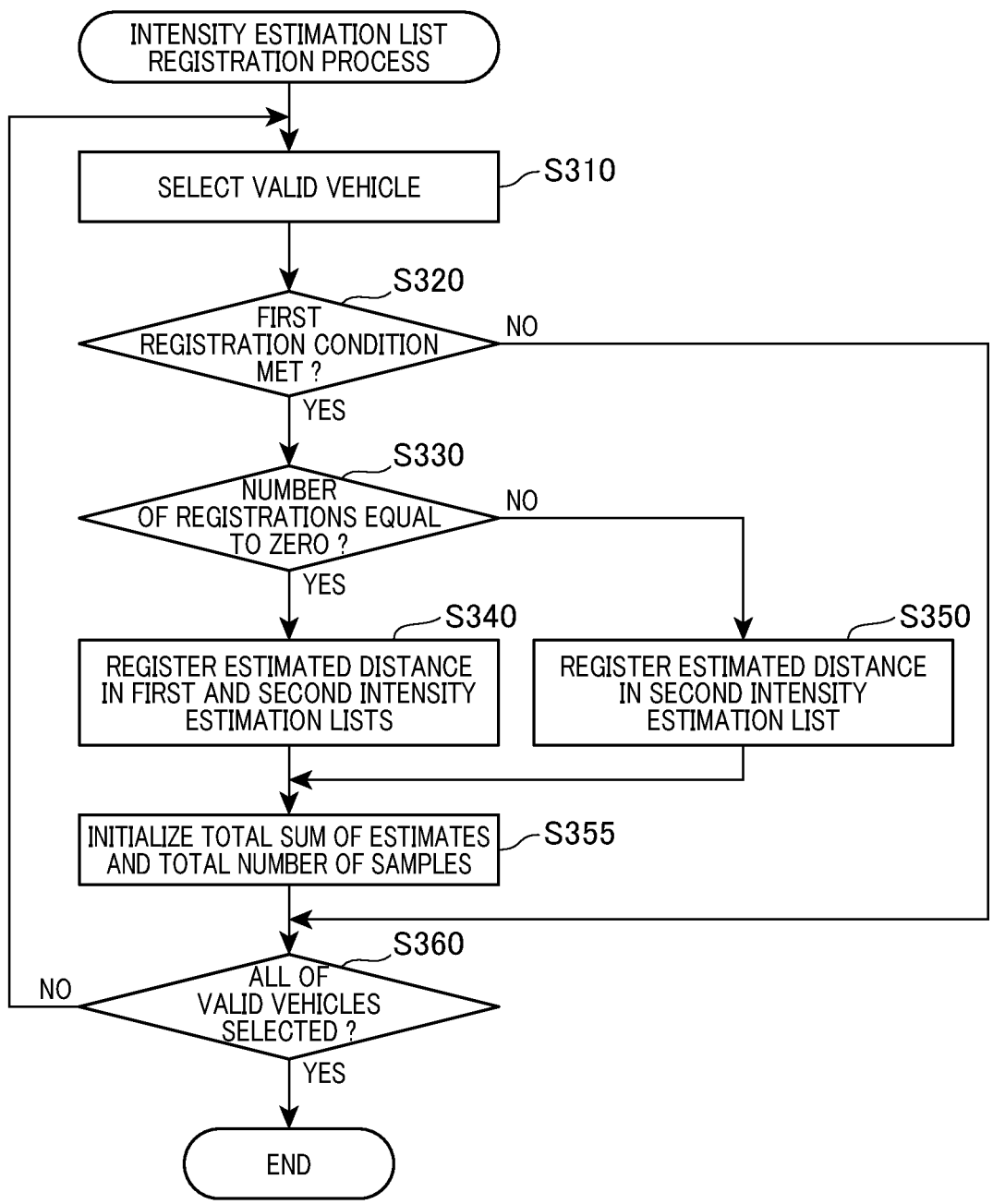
FIG. 9 is a flowchart of an intensity estimation list registration process.

Upon the intensity estimation list registration process being performed, as illustrated in FIG. 9, the electronic control device 10 first selects at S310, among the valid vehicles selected at S150, a valid vehicle that has not yet been selected as being subjected to the process steps S320 to S350 described later, as a subject valid vehicle.

At S320, the electronic control device 10 determines whether a preset first registration condition is met for the subject valid vehicle. The first registration condition of the present embodiment is that the total number of samples for the subject valid vehicle exceeds 200.

If the first registration condition is not met, the electronic control device 10 proceeds to S360. If the first registration condition is met, then at S330 the electronic control device 10 determines whether the number of registrations in the first intensity estimation list LS1 is zero.

Figure 10:
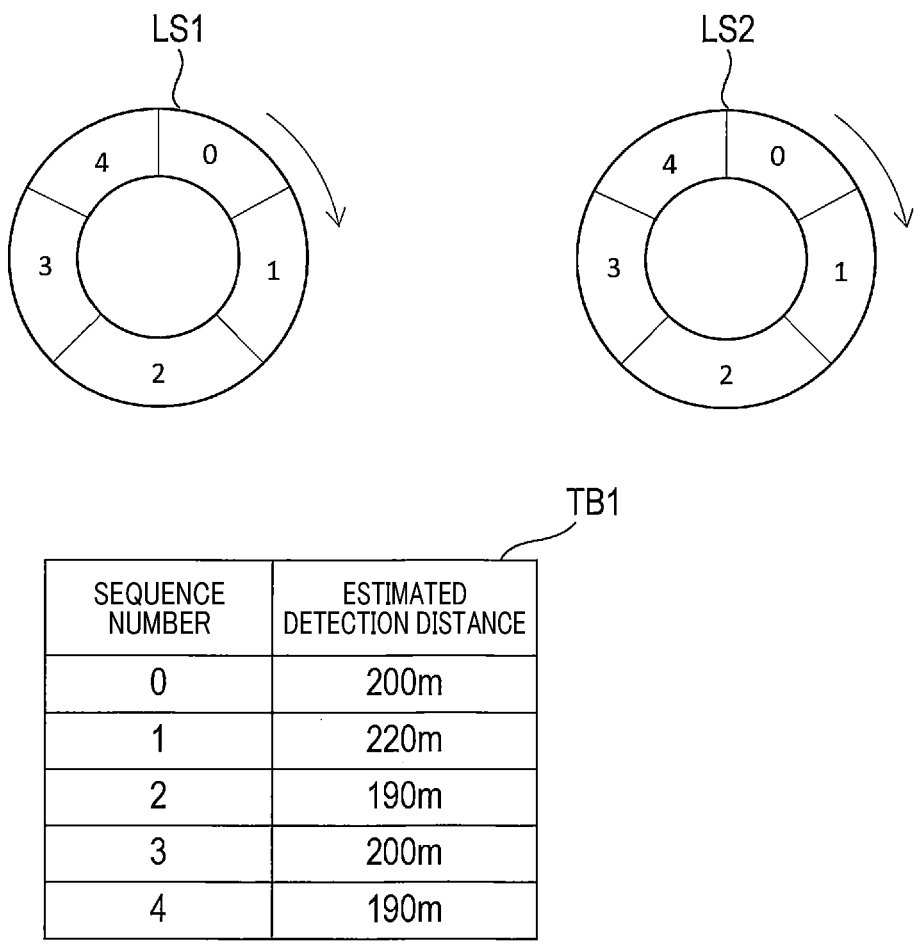
FIG. 10 is an illustration of intensity estimation lists.

The first intensity estimation list LS1 and the second intensity estimation list LS2 are provided in the RAM of the electronic control device 10. The first intensity estimation list LS1 and the second intensity estimation list LS2 are each formed in a ring buffer structure, as illustrated in FIG. 10. Therefore, the estimated detection distance is written sequentially into and from the first address of the first intensity estimation list LS1. The same is true for the second intensity estimation list LS2. After the estimated detection distance is written into the last address of the first intensity estimation list LS1, the next estimated detection distance is to be written to the first address. The same is true for the second intensity estimation list LS2. In FIG. 10, the table TB1 shows an example of the estimated detection distances registered in the first intensity estimation list LS1.

If, at S330, the number of registrations in the first intensity estimation list LS1 is zero (i.e., the estimated detection distance has not been registered in the first intensity estimation list LS1 for the subject valid vehicle), the electronic control device 10 registers the average of estimates for the subject valid vehicle in the first intensity estimation list LS1 and the second intensity estimation list LS2 at S340 and then proceeds to S355.

If the number of registrations in the first intensity estimation list LS1 is not zero (i.e., at least one estimated detection distance has already been registered in the first intensity estimation list LS1 for the subject valid vehicle), the electronic control device 10 registers the average of estimates for the subject valid vehicle in the second intensity estimation list LS2 at S350, and then proceeds to S355.

Upon transition to S355, the electronic control device 10 initializes (i.e., sets to 0) the total sum of estimates and the total number of samples for the subject valid vehicle, and then proceeds to S360.

Upon transition to S360, the electronic control device 10 determines whether all of the valid vehicles have been selected as a subject valid vehicle. If not all of the valid vehicles have been selected as a subject valid vehicle, the electronic control device 10 proceeds to S310. If all of the valid vehicles have been selected as a subject valid vehicle, the electronic control device 10 terminates the intensity estimation list registration process.

Upon completion of the intensity estimation list registration process, the electronic control device 10 performs a lost-track list registration process at S190, as illustrated in FIG. 5.

A procedure of the lost-track list registration process will now be described.

Figure 11:
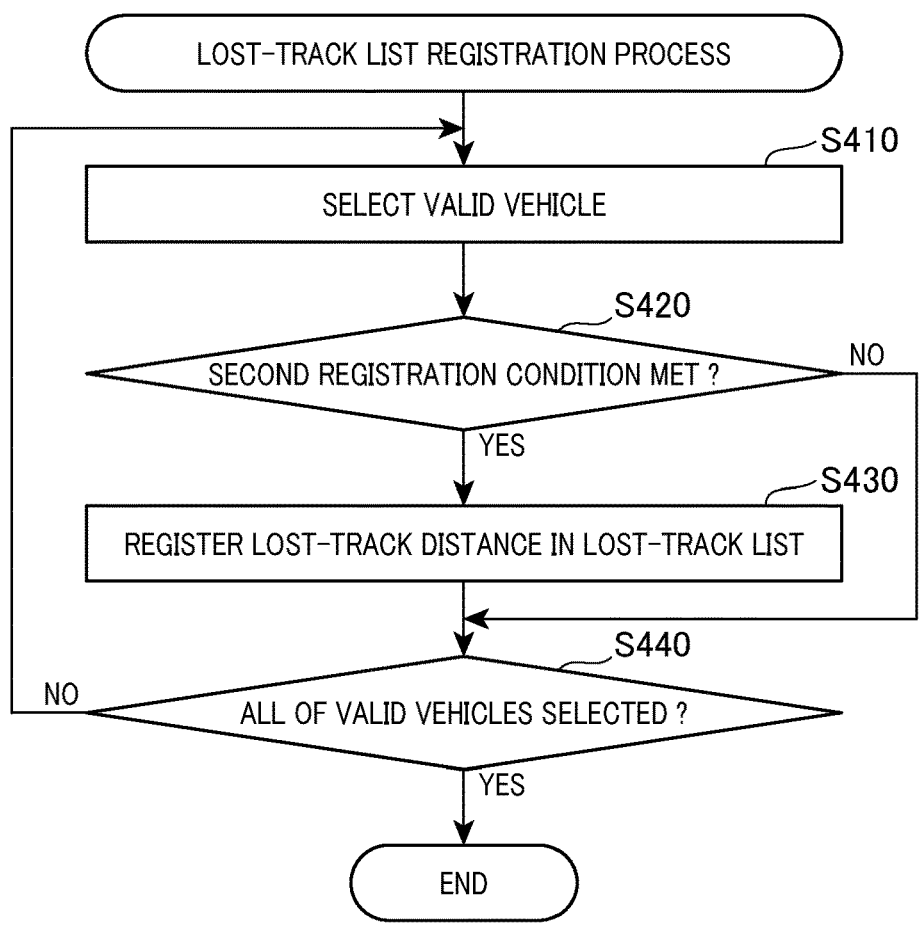
FIG. 11 is a flowchart of a lost-track list registration process.

Upon the lost-track list registration process being performed, as illustrated in FIG. 11, the electronic control device 10 selects at S410, among the valid vehicles selected at S150, a valid vehicle that has not yet been selected as being subjected to the process steps S420 and S430 described later, as a subject valid vehicle.

At S420, the electronic control device 10 determines whether a preset second registration condition is met for the subject valid vehicle. The second registration condition of the present embodiment is that the number of extrapolated frames for the subject valid vehicle exceeds a preset number of lost-tracks (e.g., five).

If the second registration condition is not met, the electronic control device 10 proceeds to S440. If the second registration condition is met, then at S430 the electronic control device 10 registers the distance to the subject valid vehicle, as a lost-track distance, in the current frame on the lost-track list LS3, and proceeds to S440.

Figure 12:
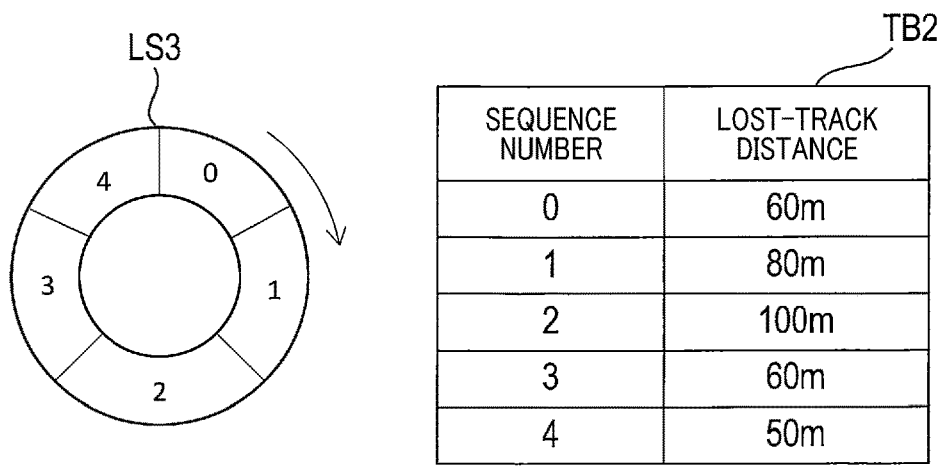
FIG. 12 is an illustration of a lost-track list.

The lost-track list LS3 is provided in the RAM of the electronic control device 10. The lost-track list LS3 is formed in a ring buffer structure, as illustrated in FIG. 12. Therefore, the lost-track distance is written sequentially into and from the first address of the lost-track list LS3. After the lost-track distance is written into the last address of the lost-track list LS3, the next lost-track distance is to be written into the first address. In FIG. 12, the table TB2 shows an example of the lost-track distances registered in the lost-track list LS3.

Upon transition to S440, the electronic control device 10 determines whether all of the valid vehicles have been selected as a subject valid vehicle. If not all of the valid vehicles have been selected as a subject valid vehicle, the electronic control device 10 proceeds to S410. If all of the valid vehicles have been selected as a subject valid vehicle, the electronic control device 10 terminates the lost-track list registration process.

Upon completion of the lost-track list registration process, the electronic control device 10 performs a lost-track list registration process at S190, as illustrated in FIG. 5.

Upon completion of the detection performance estimation process, the electronic control device 10 performs an intensity estimation list recovery process at S30, as illustrated in FIG. 4.

Specifically, if the preset intensity estimation refresh condition is met, the electronic control device 10 replaces the estimated detection distance that is less than a refresh distance preset according to the degradation level described later, among the estimated detection distances registered in the second intensity estimation list LS2, with the refresh distance.

The intensity estimation refresh condition is that one of a first refresh condition and a second refresh condition described later is met.

The first refresh condition is that a difference in S/N between the latest estimated detection distance and the oldest estimated detection distance registered in the second intensity estimation list LS2 is less than 0.1 times.

The electronic control device 10 determines whether the first refresh condition is met in the following manner.

The electronic control device 10 first calculates a distance threshold using Equation (3). The electronic control device 10 determines that the first refresh condition is met if the oldest estimated detection distance is less than or equal to the distance threshold, as shown in Equation (4).

(Distance Threshold)=(Latest Estimated Detection Distance)×(0.1^0.25)  (3)

(Oldest Estimated Detection Distance)≤(Distance Threshold)  (4)

The second refresh condition is that both the third and fourth refresh conditions described later are met.

The third refresh condition is that a refresh time has elapsed since the latest estimated detection distance was registered in the second intensity estimation list LS2. In the present embodiment, the refresh time is set to 60 seconds.

The fourth refresh condition is that the number of valid vehicles selected in the current frame is less than or equal to zero.

In FIG. 13, the table TB3 shows the intensity estimation refresh condition. In the present embodiment, according to the table TB5 of FIG. 13, the refresh distances at the degradation levels 0, 1, 2, 3, and 4 are set to 200 m, 190 m, 165 m, 140 m, and 115 m, respectively.

Upon completion of the process step S30, the electronic control device 10 performs a lost-track list recovery process at S40, as illustrated in FIG. 4.

Specifically, in response to a preset lost-track refresh condition being met, the electronic control device 10 replaces an estimated detection distance that is less than a preset refresh distance according to the degradation level, among the estimated detection distances registered in the lost-track list LS3, with the refresh distance.

The lost-track refresh condition is that both a fifth refresh condition and a sixth refresh condition, described later, are met.

The fifth refresh condition is that a refresh time has elapsed since the latest lost-track distance was registered in the lost-track list LS3.

The sixth refresh condition is that one of a seventh refresh condition and an eighth refresh condition described later is met.

The seventh refresh condition is that the number of valid vehicles at the estimated detection distances greater than or equal to the best estimated detection distance preset according to the degradation level, among the estimated detection distances registered in the second intensity estimation list LS2, is less than the best number of vehicles, which is preset according to the degradation level.

The eighth refresh condition is that the average of the estimated detection distances registered in the second intensity estimation list LS2 is greater than or equal to the best estimated detection distance preset according to the degradation level.

In FIG. 13, the table TB4 shows the lost-track refresh condition. In the present embodiment, according to the table TB5 of FIG. 13, the best estimated distances at the degradation levels 0, 1, 2, 3, and 4 are set to 200 m, 200 m, 200 m, 150 m, and 130 m, respectively. The best numbers of vehicles at the degradation levels 0, 1, 2, 3, and 4 are set to 3, 3, 3, 3, 3, respectively.

Upon completion of the process step S40, the electronic control device 10 performs a degradation level determination process at S50, as illustrated in FIG. 4.

Specifically, the electronic control device 10 first calculates the average of the estimated detection distances registered in the first intensity estimation list LS1 (hereinafter referred to as a first intensity distance average) and the average of the estimated detection distances registered in the second intensity estimation list LS2 (hereinafter referred to as a second intensity distance average).

The electronic control device 10 employs whichever of the first intensity distance average and the second intensity distance average is greater as an intensity distance average.

The electronic control device 10 calculates the average of the lost-track distances registered in the lost-track list LS3 as a lost-track distance average.

The electronic control device 10 uses the intensity distance average and the lost-track distance average to determine the degradation level on a 5-point scale from 0 to 4. The degradation level 4 corresponds to the lowest performance. As illustrated in FIG. 14, in the present embodiment, level-up distance thresholds at the degradation levels 1, 2, 3, and 4 are set to 175 m, 150 m, 125 m, and 100 m, respectively. Level-down distance thresholds at the degradation levels 1, 2, 3, and 4 are set to 195 m, 165 m, 140 m, and 115 m, respectively.

The electronic control device 10 transitions the degradation level in response to at least one of the intensity distance average and the lost-track distance average falling below any one of the level-up distance thresholds. The electronic control device 10 transitions the degradation level in response to at least one of the intensity distance average and the lost-track distance average exceeding any one of the level-down distance thresholds.

For example, the electronic control device 10 sets the degradation level to 1 in response to at least one of the intensity distance average and the lost-track distance average falling below 175 m when the degradation level is 0. For example, the electronic control device 10 sets the degradation level to 0 in response to at least one of the intensity distance average and the lost-track distance average exceeding 190 m when the degradation level is 1.

Upon completion of the process step S50, the electronic control device 10 performs an object state quantity transmission process at S60, as illustrated in FIG. 4. Specifically, the electronic control device 10 transmits object state quantity information that indicates object state quantities for each of the objects recognized in the current frame, to a later stage system. The object state quantities include center coordinates (x, y) of the rectangle recognized as the object, the width of the rectangle, the depth of the rectangle, the relative speed (vx, vy), the number of tracked frames, the number of extrapolated frames, and the estimated detection distance.

The reason for transmitting the object state quantity information to the later stage system is to use it on the later stage system side in combination with other sensors, such as the millimeter-wave radar or to change usage of targets detected by the radar device 20 in each application of the system.

Upon completion of the process step S60, the electronic control device 10 terminates the main routine.

The obstacle recognition apparatus 1 configured as described above is mounted to a vehicle and includes the radar device 20 and the electronic control device 10.

The radar device 20 detects an object distance to an object around the vehicle by transmitting and receiving radar waves.

The electronic control device 10 estimates an estimated detection distance based on the detected object distances and intensities of the radar waves reflected by the object and received by the radar device 20. The estimated detection distance has a maximum value of the object distance detectable by the radar device 20.

Based on results of detection by the radar device 20, the electronic control device 10 estimates the object distance as a lost-track distance at the timing when the radar device 20 transitions from a detected state in which the radar device 20 is aware of the presence of the object to a non-detected state in which the radar device 20 is not aware of the presence of the object.

The electronic control device 10 determines the degradation of detection performance of the radar device 20 based on the estimated detection distance and the lost-track distance.

As such, the obstacle recognition apparatus 1 can estimate the object distance at which the radar wave intensity is at or below the detection threshold $T_0$ that is lower than the reception intensity, as the estimated detection distance, based on the object distances and the radar wave reception intensities. This allows the obstacle recognition apparatus 1 to estimate the estimated detection distance even in a case where the obstacle recognition apparatus 1 is unable to detect the object distance at the timing of transition from the detected state to the non-detected state (i.e., the lost-track distance), near the limit distance at which the obstacle recognition apparatus 1 can barely detect the object distance.

This allows the obstacle recognition apparatus 1 to increase the accuracy of determining the degradation of distance detection performance.

The obstacle recognition apparatus 1 estimates the object distance at the timing of transition from the detected state to the non-detected state as a lost-track distance.

This allows the obstacle recognition apparatus 1 to determine the degradation of detection performance of the radar device 20 due to water adhering to the vehicle in a rainfall environment or due to a condition of an optical window surface of the obstacle recognition apparatus 1, which does not follow the radar equation.

This allows the obstacle recognition apparatus 1 to increase the accuracy of determining the degradation of distance detection performance.

The electronic control device 10 determines whether occlusion is occurring where the second preceding vehicle PV2 is partially hidden behind the first preceding vehicle PV1 as seen from the radar device 20. In response to the electronic control device 10 determining that occlusion is occurring, the electronic control device 10 excludes the estimated detection distance to the second preceding vehicle PV2 from the determination of a degradation of detection performance of the radar device 20. This allows the obstacle recognition apparatus 1 to exclude objects that are unsuitable for determining a degradation of detection performance, thereby further increasing the accuracy of determining a degradation of distance detection performance.

The electronic control device 10 determines whether the object is a roadside object. The electronic control device 10 excludes the estimated detection distance to the object determined to be a roadside object from the determination of a degradation of detection performance of the radar device 20. This allows the obstacle recognition apparatus 1 to exclude objects that are unsuitable for determining a degradation of detection performance, thereby further increasing the accuracy of determining a degradation of distance detection performance.

The electronic control device 10 determines whether the object is a virtual image. The electronic control device 10 excludes the estimated detection distance to the object determined to be a virtual image from the determination of a degradation of detection performance of the radar device 20. This allows the obstacle recognition apparatus 1 to exclude objects that are unsuitable for determining a degradation of detection performance, thereby further increasing the accuracy of determining a degradation of distance detection performance.

The electronic control device 10 uses the average of a plurality of estimated detection distances to determine a degradation of detection performance of the radar device 20. The electronic control device 10 further uses the average of a plurality of estimated lost-track distances to determine a degradation of detection performance of the radar device 20. This allows the obstacle recognition apparatus 1 to suppress effects of abnormal values on the determination of a degradation of detection performance of the radar device 20 even in cases where such abnormal values are included in a plurality of estimated detection distances or a plurality of lost-track distances, thereby minimizing deterioration of the accuracy of determining a degradation of distance detection performance.

The electronic control device 10 registers a plurality of estimated detection distances. In response to an elapsed time since the latest estimated detection distance was registered is greater than or equal to a preset refresh time, the electronic control device 10 replaces the estimated detection distance that is less than the preset refresh distance, among the plurality of registered estimated detection distances, with the refresh distance. This allows the obstacle recognition apparatus 1 to suppress the estimated detection distance that is less than the refresh distance from continuing to be registered for a long period of time, thereby suppressing occurrence of a situation where the distance detection performance is determined to be degraded despite the distance detection performance having been restored.

The electronic control device 10 registers a plurality of estimated lost-track distances. In response to an elapsed time since the latest lost-track distance was registered is greater than or equal to a preset refresh time, the electronic control device 10 replaces the lost-track distance that is less than the preset refresh distance, among the plurality of registered lost-track distances, with the refresh distance. This allows the obstacle recognition apparatus 1 to suppress the lost-track distance that is less than the refresh distance from continuing to be registered for a long period of time, thereby suppressing occurrence of a situation where the distance detection performance is determined to be degraded despite the distance detection performance having been restored.

The electronic control device 10 determines a degradation of detection performance of the radar device 20 by setting one degradation level from a plurality of degradation levels indicating a degree of degradation of detection performance of the radar device 20 based on the estimated detection distances and the lost-track distances. This allows the obstacle recognition apparatus 1 to provide a notification of the degree of deterioration in the detection performance of the radar device 20.

The electronic control device 10 outputs the estimated detection distances to the outside the obstacle recognition apparatus 1. This allows the obstacle recognition apparatus 1 to make the estimated detection distances available to systems outside the obstacle recognition apparatus 1.

The electronic control device 10 is provided with a first intensity estimation list LS1 and a second intensity estimation list LS2. On the first intensity estimation list LS1, estimated detection distances that are less than or equal to a preset upper limit for the same object are registered. In the present embodiment, the upper limit is one. On the second intensity estimation list LS2, estimated detection distances for the same object are registered beyond the upper limit.

Providing the first intensity estimation list LS1 can suppress registration of only the estimated detection distance for one valid vehicle. This allows the obstacle recognition apparatus 1 to suppress occurrence of a situation where the detection performance of the radar device 20 is determined to be degraded using only one vehicle. For example, in cases where the preceding vehicle that the own vehicle is following is dirty, the detection performance of the radar device 20 may be determined to be degraded despite no degradation in the detection performance of the radar device 20.

Providing the second intensity estimation list LS2 allows the electronic control device 10 to determine a degradation of detection performance of the radar device 20 based on a plurality of estimated detection distances to one valid vehicle. This allows the obstacle recognition apparatus 1 to, for example, in response to recovery of the detection performance due to a change in a preceding vehicle in the course of the own vehicle following the preceding vehicle, determine a degradation of detection performance according to recovery of detection performance.

In the embodiment described above, the obstacle recognition apparatus 1 corresponds to a distance detection apparatus, and the radar device 20 corresponds to a distance detection unit. As illustrated in FIG. 1B, the electronic control device 10 includes, as functional blocks, a detection distance estimation unit 1001 responsible for execution of the process step S110, a lost-track distance estimation unit 1002 responsible for execution of the process step S420, and a performance estimation unit 1003 responsible for execution of the process step S50.

The electronic control device 10 further includes, as functional blocks, an occlusion determination unit 1004 responsible for execution of the process step S120, a roadside object determination unit 1005 responsible for execution of the process step S130, a virtual image determination unit 1006 responsible for execution of the process step S140, an occlusion exclusion unit 1007, a roadside object exclusion unit 1008, and a virtual image exclusion unit 1009 that are responsible for execution of the process step S150.

The electronic control device 10 further includes, as functional blocks, a detection distance registration unit 1010 responsible for execution of the process step S180, a detection distance refresh unit 1011 responsible for execution of the process step S30, a lost-track distance registration unit 1012 responsible for execution of the process step S190, and a lost-track distance refresh unit 1013 responsible for execution of the process step S40.

The electronic control device 10 further includes, as a functional block, an output unit 1014 responsible for execution of the process step S60. These functions of the electronic control device 10 may be implemented by the CPU 11 executing the program stored in the memory 12. The first intensity estimation list LS1 corresponds to a first estimation list, and the second intensity estimation list LS2 corresponds to a second estimation list.

As above, while one specific embodiment of the present disclosure has been described above, the present disclosure is not limited to the above-described embodiment, and may be implemented with various modifications.

Modification 1

In the above embodiment, the peak intensity is used as an example. In an alternative embodiment, a pulse width may be used instead of the peak intensity because the pulse width also widens as the peak intensity increases.

The electronic control device 10 and its method described in the present disclosure may be implemented by a dedicated computer including a processor and a memory programmed to execute one or more functions embodied by computer programs. Alternatively, the electronic control device 10 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium. The technique for implementing the functions of each part included in the electronic control device 10 does not necessarily include software, and all of its functions may be implemented using one or more pieces of hardware.

A plurality of functions possessed by one constituent element in any one of the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in any one of the foregoing embodiments may be omitted. At least part of configuration of any one of the foregoing embodiments may be added to or replaced with configuration of another one of the foregoing embodiments.

Besides the obstacle recognition apparatus 1 described above, the present disclosure can be implemented in various modes such as a system including the obstacle recognition apparatus 1 as a constituent element, a program for causing a computer to serve as the obstacle recognition apparatus 1, a non-transitory and tangible storage medium such as a semiconductor memory storing this program, a distance detection method, and others.

What is claimed is:

1. A distance detection apparatus for a vehicle, comprising:
   a distance detection unit configured to detect object distances to an object around the vehicle by transmitting and receiving radar waves;
   a detection distance estimation unit configured to estimate an estimated detection distance having a maximum value of the object distances detectable by the distance detection apparatus, based on the object distances detected by the distance detection unit and intensities of the radar waves reflected by the object and received by the distance detection unit;
   a lost-track distance estimation unit configured to estimate, as a lost-track distance, a particular object distance at a timing of transition from a detected state in which the distance detection unit is aware of presence of the object to a non-detected state in which the distance detection unit is not aware of presence of the object, based on a result of detection by the distance detection unit;
   a performance determination unit configured to determine a degradation of detection performance of the distance detection unit based on the estimated detection distance and the lost-track distance, the performance determination unit being configured to change a degradation level indicating a degree of degradation of the detection performance of the distance detection unit, in response to at least one of the estimated detection distance and the lost-track distance falling below a first threshold, and to change the degradation level in response to at least one of the estimated detection distance and the lost-track distance exceeding a second threshold.

2. The distance detection apparatus according to claim 1, further comprising:
   an occlusion determination unit configured to determine whether occlusion, which refers to a situation where a second object is partially hidden behind a first object as seen from the distance detection unit, is occurring; and
   an occlusion exclusion unit configured to, in response to the occlusion determination unit determining that the occlusion is occurring, exclude an estimated detection distance to the second object from the determination by the performance determination unit.

3. The distance detection apparatus according to claim 1, further comprising:
   a roadside object determination unit configured to determine whether the object is a roadside object; and
   a roadside object exclusion unit configured to exclude, from the determination by the performance determination unit, the estimated detection distance to the object determined by the roadside object determination unit to be a roadside object.

4. The distance detection apparatus according to claim 1, further comprising:
   a virtual image determination unit configured to determine whether the object is a virtual image; and
   a virtual image exclusion unit configured to exclude, from the determination by the performance determination unit, the estimated detection distance to the object determined by the virtual image determination unit to be a virtual image.

5. The distance detection apparatus according to claim 1, wherein
   the performance determination unit is configured to use an average of a plurality of the estimated detection distances estimated by the detection distance estimation unit to determine the degradation of detection performance of the distance detection unit.

6. The distance detection apparatus according to claim 1, wherein
   the performance determination unit is configured to use an average of a plurality of lost-track distances estimated by the lost-track distance estimation unit to determine the degradation of detection performance of the distance detection unit.

7. The distance detection apparatus according to claim 1, further comprising:
   a detection distance registration unit configured to register a plurality of estimated detection distances from the estimated detection distances estimated by the detection distance estimation unit; and
   a detection distance refresh unit configured to, in response to an elapsed time since a latest estimated detection distance is registered by the detection distance registration unit being greater than or equal to a preset refresh time, replace an estimated detection distance that is less than a preset refresh distance, among the plurality of estimated detection distances registered by the detection distance registration unit, with the preset refresh distance.

8. The distance detection apparatus according to claim 1, further comprising:
   a lost-track distance registration unit configured to register a plurality of lost-track distances estimated by the lost-track distance estimation unit; and
   a lost-track distance refresh unit configured to, in response to an elapsed time since a latest lost-track distance is registered by the lost-track distance registration unit being greater than or equal to a preset refresh time, replace a lost-track distance that is less than a preset refresh distance, among the plurality of lost-track distances registered by the lost-track distance registration unit, with the preset refresh distance.

9. The distance detection apparatus according to claim 1, wherein
   the performance determination unit is configured to determine the degradation of detection performance of the distance detection unit by setting one of a plurality of degradation levels indicating different degrees of degradation of detection performance of the distance detection unit based on the estimated detection distance and the lost-track distance.

10. The distance detection apparatus according to claim 1, further comprising:

an output unit configured to output the estimated detection distance estimated by the detection distance estimation unit to outside the distance detection apparatus.

11. The distance detection apparatus according to claim 1, further comprising:
    a first estimation list in which estimated detection distances for the same object that are less than or equal to a preset upper limit, among a plurality of estimated detection distances estimated by the detection distance estimation unit, are registered; and
    a second estimation list in which the estimated detection distances for the same object that are greater than the preset upper limit, among the plurality of estimated detection distances estimated by the detection distance estimation unit, are registered.

12. A distance detection apparatus for a vehicle, comprising:
    a distance detection unit configured to detect object distances to an object around the vehicle by transmitting and receiving radar waves;
    a non-transitory memory storing one or more computer programs; and
    a processor executing the one or more computer programs to:
    estimate an estimated detection distance having a maximum value of the object distances detectable by the distance detection apparatus, based on the object distances detected by the distance detection unit and intensities of the radar waves reflected by the object and received by the distance detection unit;
    estimate, as a lost-track distance, a particular object distance at a timing of transition from a detected state in which the distance detection unit is aware of presence of the object to a non-detected state in which the distance detection unit is not aware of presence of the object, based on a result of detection by the distance detection unit;
    determine a degradation of detection performance of the distance detection unit based on the estimated detection distance and the lost-track distance; and
    change a degradation level indicating a degree of degradation of the detection performance of the distance detection unit, in response to at least one of the estimated detection distance and the lost-track distance falling below a first threshold, and to change the degradation level in response to at least one of the estimated detection distance and the lost-track distance exceeding a second threshold.

* * * * *